US005651595A

United States Patent [19]
Willis

[11] Patent Number: 5,651,595
[45] Date of Patent: Jul. 29, 1997

[54] STORAGE CABINET

[76] Inventor: Thomas T. Willis, 2 O'Brien Ct., Williston, Vt. 05495

[21] Appl. No.: 600,753

[22] Filed: Feb. 13, 1996

[51] Int. Cl.⁶ .................................................. A47B 49/00
[52] U.S. Cl. ................... 312/249.2; 312/9.46; 312/285; 312/351.2; 312/244; 312/111; 220/260; 70/78; 109/67
[58] Field of Search .................. 312/249.2, 9.9, 312/9.45, 9.46, 9.64, 59, 285, 351.2, 244, 111, 198, 107; 49/73.1, 94; 220/260, 262, 263; 206/308.1, 387.15; 403/348, 349; 70/164, 78; 109/67, 68

[56] References Cited

U.S. PATENT DOCUMENTS

| | | | |
|---|---|---|---|
| 1,015,201 | 1/1912 | Marinelli | 312/244 |
| 1,221,796 | 4/1917 | Egbert | 312/249.2 |
| 1,330,181 | 2/1920 | Gibbs | 312/249.2 X |
| 1,490,814 | 4/1924 | Flanagan | 312/244 X |
| 1,921,652 | 8/1933 | Bohnert | 312/285 X |
| 2,511,949 | 6/1950 | Simon | 312/111 X |
| 3,047,348 | 7/1962 | Hickox | 312/249.2 X |
| 3,608,991 | 9/1971 | Wade | 312/107 |
| 3,692,376 | 9/1972 | McKinsey et al. | 312/9.46 |
| 3,736,036 | 5/1973 | Mathus | 312/9.46 X |
| 3,765,738 | 10/1973 | Cobb | 312/9.46 |
| 3,862,787 | 1/1975 | Hilsinger | 312/9.46 X |
| 3,889,817 | 6/1975 | Berkman | 312/9.46 X |
| 4,179,168 | 12/1979 | Isaac et al. | 312/59 X |
| 4,335,989 | 6/1982 | Hultgren | . |
| 4,753,343 | 6/1988 | Flynn | 312/285 X |
| 4,802,587 | 2/1989 | Armijo et al. | 312/9.46 X |
| 4,826,261 | 5/1989 | Nademlejnsky | 312/9.46 |
| 4,844,564 | 7/1989 | Price, Sr. et al. | . |
| 4,874,088 | 10/1989 | Leben | 206/387.15 |
| 5,020,043 | 5/1991 | Kohler | . |
| 5,031,779 | 7/1991 | Szenay et al. | . |
| 5,328,289 | 7/1994 | Fussler | 403/348 X |

*Primary Examiner*—Peter M. Cuomo
*Assistant Examiner*—Janet M. Wilkens
*Attorney, Agent, or Firm*—Salter & Michaelson

[57] ABSTRACT

A storage cabinet for storing articles therein includes a stand having a base portion, and an upright pole extending upwardly along a longitudinal axis from the base portion. A housing of the storage cabinet has a top wall, a bottom wall in spaced and parallel relation to the top wall, and side walls interconnecting the bottom and top walls together. The side walls define a plurality of storage compartments for receiving articles therein. The bottom wall has an axial bore for receiving a thrust bearing mounted on the pole of the stand for rotatably mounting the housing on the pole about the axis. A plurality of doors, one for each compartment, are selectively movable between an open position in which the compartments can be accessed, and a closed position in which the doors block the openings into the compartments.

9 Claims, 4 Drawing Sheets

STORAGE CABINET

BACKGROUND AND SUMMARY OF THE INVENTION

This invention relates generally to storage cabinets, and more particularly to a storage cabinet designed for storing compact discs, floppy discs, cassettes and the like.

Storage cabinets for computer discs, compact discs, cassettes and the like are well-known in the art. Reference can be made to any of the U.S. Pat. Nos. 3,736,036 to Mathus, U.S. Pat. No. 3,765,738 to Cobb, U.S. Pat. No. 3,862,787 to Hilsinger, U.S. Pat. No. 3,889,817 to Berkman, U.S. Pat. No. 4,335,989 to Hultgren, U.S. Pat. No. 4,802,587 to Armijo et al., U.S. Pat. No. 4,826,261 to Nademlejnsky, U.S. Pat. No. 4,844,564 to Price, Sr. et al., U.S. Pat. No. 5,020,043 to Kohler, and U.S. Pat. No. 5,031,779 to Szenay et al. as representative prior art.

Although several of these patents disclose a rotatable cabinet for storing such articles, e.g., Berkman, Armijo et al., Nademlejnsky, and Szenay et al., each of these patents disclose a lazy Susan-type arrangement which requires a base having a plurality of wheels or bearings which enable the cabinet to rotate relative to the base. This construction is somewhat expensive to construct. There is presently a need for a storage cabinet which is of simple construction for enabling it to rotate about an axis so that a person may quickly and easily access any side of the cabinet.

Moreover, none of these prior art patents disclose a way to lock the articles stored within the cabinet so as to ensure they are adequately safeguarded. While several patents disclose having a door which covers the articles stored in the cabinet, there is no disclosure of being able to lock them within the cabinet. Furthermore, these patents lack any teaching of being able to stack multiple cabinets on top of each other in an interlocking relation.

Accordingly, among the several objects of the present invention are the provision of a storage cabinet for storing articles, such as compact discs, floppy discs, cassettes and the like, therein which is capable of rotating about a stand by means of a thrust bearing; the provision of such a storage cabinet which is simple in design and less costly to manufacture than prior storage cabinets; the provision of such a storage cabinet which is capable of being locked for securing the articles stored therein; the provision of such a storage cabinet which is capable of being stacked and interlocked upon another storage cabinet while still being able to rotate independently relative to one another; the provision of such a storage cabinet having a handle for carrying it by itself or with another storage cabinet when in stacked and interlocked relation; and the provision of such a storage cabinet which is durable in construction and easy to use.

In general, the invention is directed to a storage cabinet for storing articles therein comprising a stand having a base portion adapted to lie on a horizontal surface, and an upright pole extending upwardly along a longitudinal axis from the base portion. A housing of the storage cabinet has a top wall disposed along a horizontal plane, a bottom wall in spaced and parallel relation to the top wall, and means interconnecting the bottom and top walls together. The interconnecting means defines a plurality of storage compartments for receiving articles therein. The bottom wall has means for rotatably mounting the housing on the pole of the stand about the axis. The rotatable mounting means comprises a thrust bearing which is rotatably mounted on the post. The thrust bearing is received within an axial bore formed in the bottom wall of the housing, the bore being defined by an annular wall and an end wall which combine to capture the thrust bearing therein.

More specifically, the storage cabinet further includes a plurality of doors, one for each compartment, which are selectively movable between an open position in which the compartments can be accessed, and a closed position in which the doors block the openings into the compartments. The bottom and top walls of the housing each further comprise a track formed along the outer edge margin of the wall. The tracks receive the plurality of doors therein for guiding the movement of the doors between their open and closed positions. The doors are interconnected to one another by flexible connecting means. The arrangement is such that by moving one door to its closed position, the remaining doors are moved to their closed position. The storage cabinet further comprises means for locking one of the doors in its closed position thereby locking all of the doors in their closed position.

Other objects, features and advantages of the invention shall become apparent as the description thereof proceeds when considered in connection with the accompanying illustrative drawings.

BRIEF DESCRIPTION OF THE DRAWINGS

Corresponding reference numerals designate corresponding parts throughout the several views of the drawings.

DETAILED DESCRIPTION OF THE PREFERRED EMBODIMENT

Figure 1:
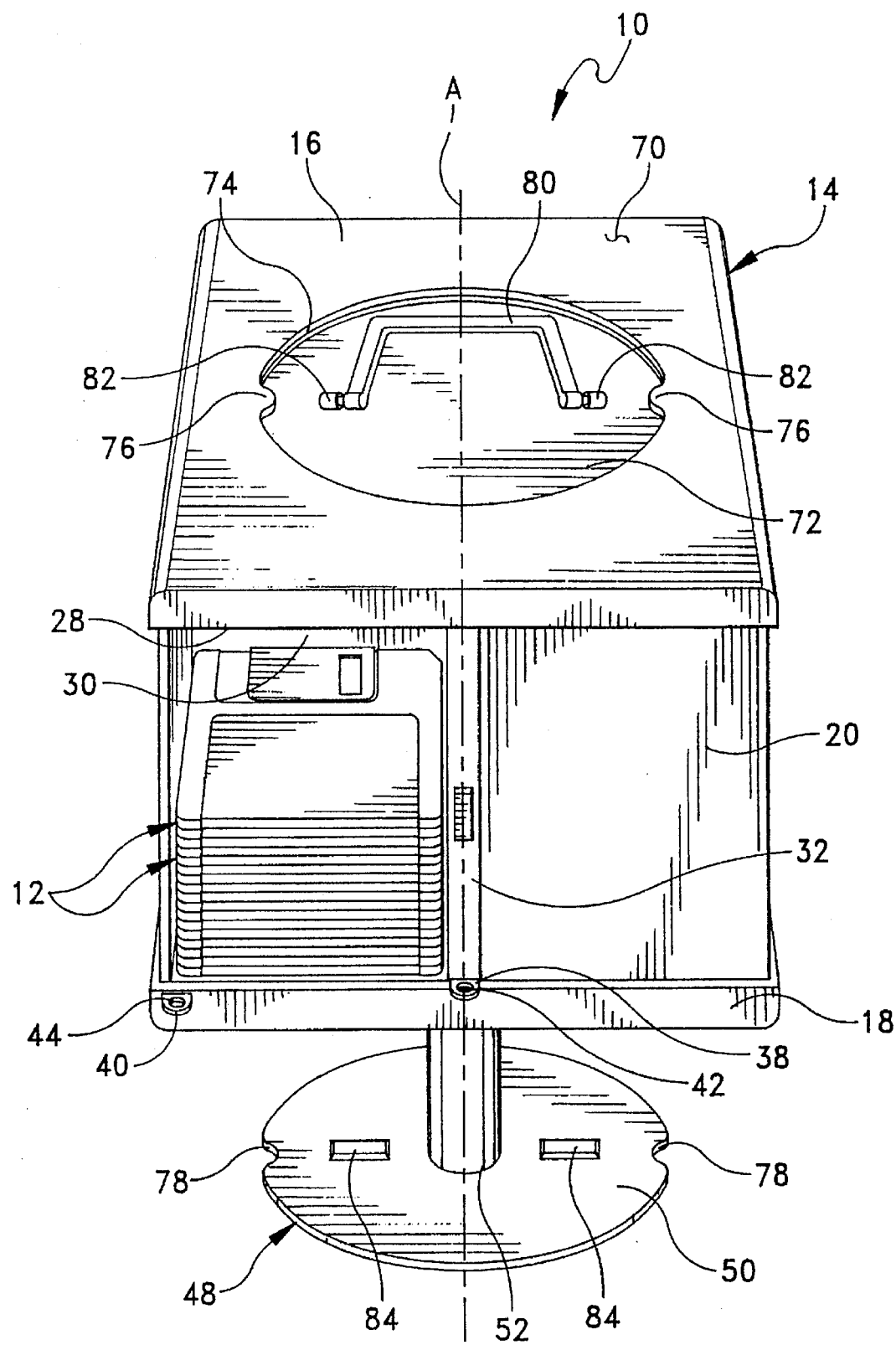
FIG. 1 is a front perspective view of a storage cabinet of the present invention.

Referring now to the drawings, and more particularly FIG. 1, there is generally indicated at 10 a storage cabinet for storing therein articles, each generally indicated at 12, such as compact discs, floppy discs, cassettes and the like. The storage cabinet 10 is of the type capable of rotating about a central longitudinal axis A for allowing a person to access the articles 12 from any side of the storage cabinet 10.

More specifically, the storage cabinet 10 comprises a box-shaped housing generally indicated at 14 having a rectangular-shaped top wall 16 disposed along a horizontal plane and a rectangular-shaped bottom wall 18 which is in spaced and parallel relation to the top wall 16. The housing 14 has four side walls 20, 22, 24 and 26 which are constructed and arranged for receiving and storing the articles 12 within the housing 14. Each side wall 20, 22, 24 and 26 (broadly referred to as "interconnecting means") is mounted between the top and bottom walls 16, 18. The space between each side wall and its adjacent side wall defines an opening 28 which accesses a compartment 30 for storing articles. Interior walls (not designated in FIG. 4) within each compartment 30 have shelving integrally formed therein which support the articles 12 in the manner illustrated in FIGS. 1 and 4. This arrangement is well-known in the art and is disclosed in many of the aforementioned patents.

Figure 4:
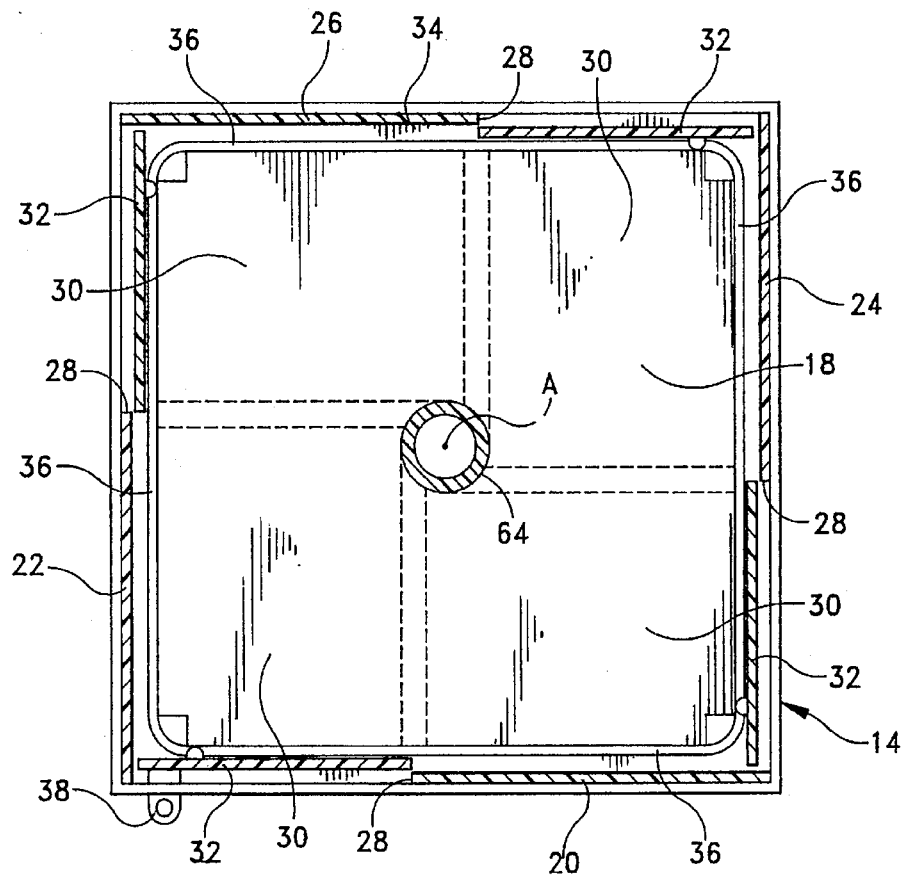
FIG. 4 is a cross-sectional view taken along line 4—4 of FIG. 2.

As shown, there are four compartments 30 provided within the housing 14 for storing the articles 12 therein. Four doors 32, one for each compartment 30, are slidably connected to the housing 14 for closing the openings 28 to the compartments 30. More specifically, the doors 32 are selectively movable between an open position (FIG. 1) in which the compartments 30 can be accessed, and a closed position (FIG. 2) in which the doors block the openings 28 into the compartments 30. The top and bottom walls 16, 18 of the housing 14 each have a track 34 formed along their outer edge margin for guiding the movement of the doors 32 between their open and closed positions. FIG. 4 illustrates the track 34 formed in the bottom wall 18 of the housing 14 with the doors 32 in their closed position. It should be noted that the track formed in the top wall 16 is identically constructed as the track 34 formed in the bottom wall 18, and for purposes of economy, is not specifically shown. The doors 32 are connected to each other by flexible straps 36 or cords which are suitably connected adjacent doors 32 in the manner illustrated in FIG. 4. Since there are four doors 32, there are four flexible straps 36 interconnecting the doors with each other. The arrangement is such that by moving one of the doors 32 to its closed position, the remaining doors 32 are moved to their closed position. This arrangement enables the user of the storage cabinet 10 to close all of the doors 32 at once without having to close each door 32 separately.

For locking the doors 32 in their closed position to ensure that the contents stored in the storage cabinet 10 are secure, locking means embodying a pair of latch rings 38, 40 are provided. As shown, a first latch ring 38 is mounted on the lead door 32 and the second latch ring 40 is mounted on the bottom wall 18 of the housing 14. Each latch ring 38, 40 has an opening 42, 44, respectively, formed therein whereby when the doors 32 are in their closed position, the openings 42, 44 of the first and second latch rings 38, 40 are aligned to receive a lock 46 (see FIG. 2) of conventional construction for locking the doors 32 in their closed position. Thus, it will be observed that the storage cabinet of the present invention is capable of storing the articles 12, such as the disks illustrated in FIGS. 1 and 5, in a secure manner when employing the lock 46.

Figure 2:
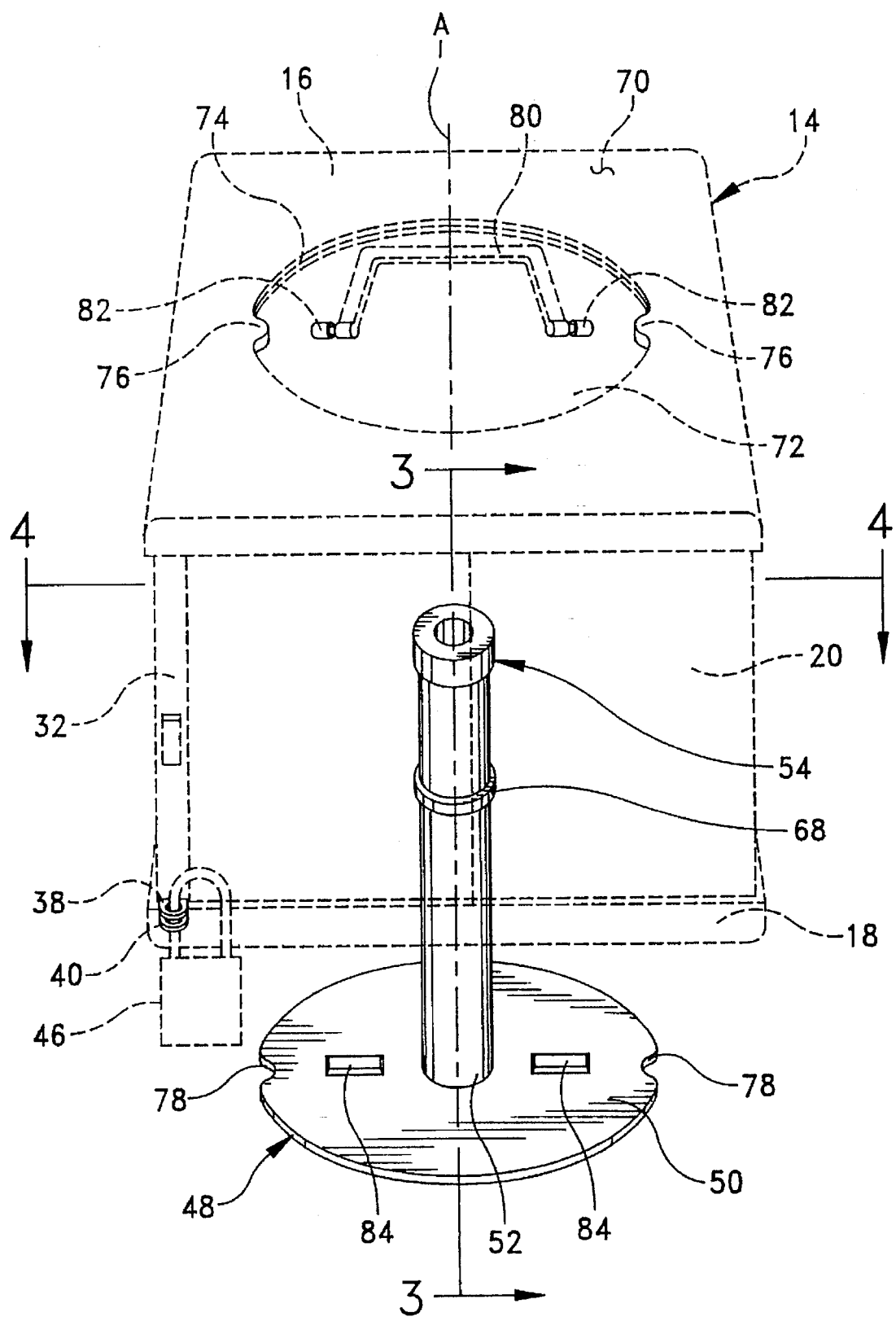
FIG. 2 is a front perspective view illustrating a housing of the storage cabinet in broken lines and a stand of the cabinet in solid lines.
Figure 3:
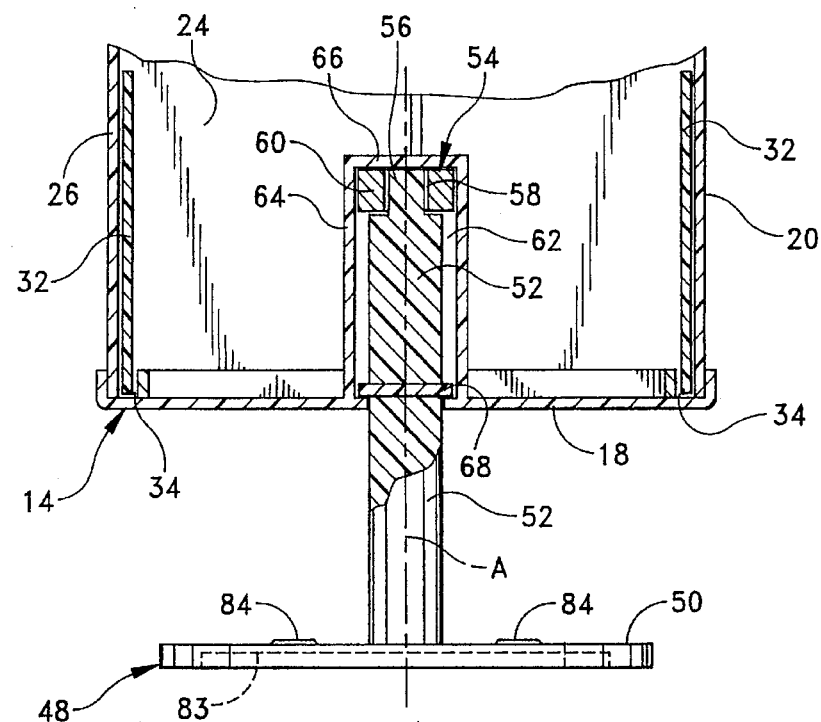
FIG. 3 is a partial cross-sectional, elevational view of the storage cabinet taken along line 3—3 of FIG. 2.

Turning now to FIGS. 2–4, the housing 14 is supported by a stand, generally indicated at 48, having a base portion 50 adapted to lie on a horizontal surface, and an upright pole 52 which extends upwardly along the longitudinal axis A from the base portion 50. The housing 14, when mounted on the stand 48, can rotate about the axis A for enabling the user of the storage cabinet 10 to position the housing 14 so that a desired compartment 30 can be accessed. A thrust bearing generally indicated at 54 (broadly referred to as "mounting means") rotatably mounts the housing 14 on the pole 52 of the stand 48. As shown in FIG. 3, the pole 52 has a reduced diameter neck portion 56 which receives an inner race 58 of the thrust bearing 54 thereon via an interference fit. An outer race 60 of the thrust bearing 54 is snugly fit within an axial bore 62 formed in the bottom wall 18 of the housing 14. More specifically, the bore 62 is defined by an annular wall 64 and an end wall 66 which combine to capture the thrust bearing 54 therein. An annular ring 68 around the pole 52 of the stand 48 is further provided below the thrust bearing 54 upon which the bottom wall 18 of the housing 14 snaps over in the manner illustrated in FIG. 3. Thus, it should be observed that the thrust bearing 54 (and the annular ring 68) enables the housing 14 of the storage cabinet 10 to rotate in either direction (clockwise or counterclockwise) so as to enable the user to access any compartment 30 from a stationary position.

The top wall 16 of the housing 14 has an upwardly facing surface 70 with a generally circularly-shaped recess 72 formed therein. The recess 72 is defined by a circumferential wall portion 74 formed in the top wall 16. The purpose of the recess 72 is for receiving the base portion 50 of the stand 48 of another identically constructed storage cabinet 10 (see FIG. 5) therein for assembling two storage cabinets 10 in stacked relation. The circumferential wall portion 74 has a pair of inwardly extending detent sections 76 which define overlying lips which are sized to be received in a pair of mating inwardly extending recesses 78 formed in the base portion 50 of the stand 48.

Figure 5:
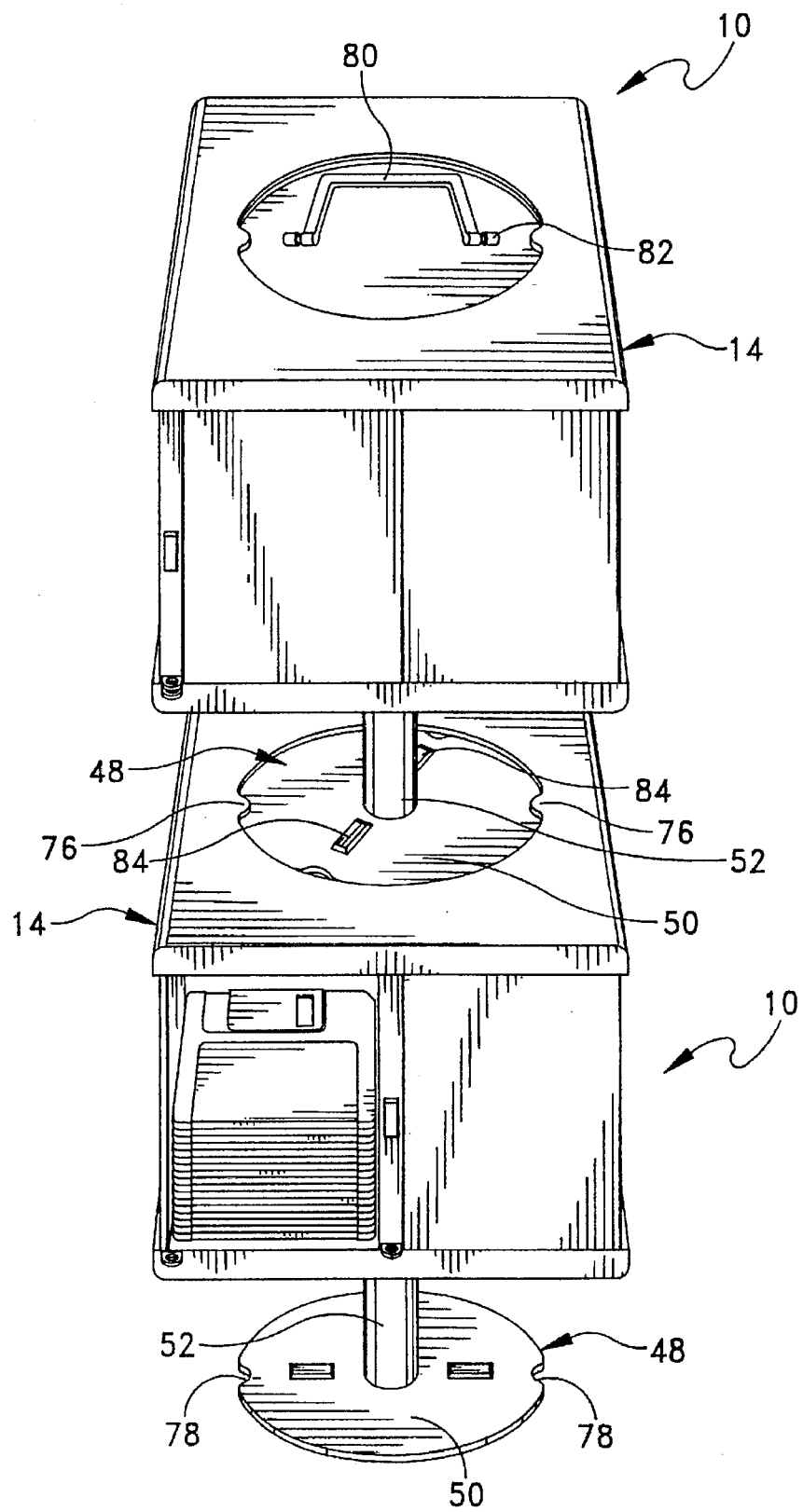
FIG. 5 is front perspective view of two storage cabinets in stacked relation.

Turning to FIG. 5, the base portion 50 of an upper cabinet 10 is received within the recess 72 formed in the top wall 16 of a lower cabinet 10 wherein the detent section 76 of the lower cabinet 10 are aligned with and received in the recesses 78 of the base portion 50 of the upper cabinet. The base portion 50 is then rotated so that the lip aspect of the detent section overlies the base portion 50 for interlocking the base portion to the housing 14. Thus, when in stacked relation, by lifting (e.g., with handle 80) the top cabinet 10, the lower cabinet (by virtue of annular ring 68) is lifted as well.

A handle 80 is mounted on the top wall 16 of the housing 14 within the recess 72 for carrying the storage cabinet 10. The handle 80 is pivotally mounted within the recess 72 by a pair of laterally spaced apart barrel-shaped members 82 which are designed to receive opposite ends of the handle 80. The base portion can be formed with a hollow region 83 (see FIG. 3) to receive the handle therein when stacking the cabinets in the manner illustrated in FIG. 5. A pair of raised finger grips 84 are formed in the base portion 50 for turning the base portion 50 when two storage cabinets 10 are placed in stacked relation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A storage cabinet for storing articles therein comprising:

a stand having a base portion adapted to lie on a horizontal surface, and an upright pole extending upwardly along a longitudinal axis from the base portion;

a housing having a top wall disposed along a horizontal plane, a bottom wall in spaced and parallel relation to the top wall, said bottom wall having means for rotatably mounting said housing on the pole of the stand about said axis, means interconnection the bottom and top walls together, said interconnecting means defining a plurality of storage compartments for receiving articles therein, said rotatable mounting means comprising a bearing which is rotatably mounted on said post, said bearing being received within an axial bore formed in the bottom wall of the housing; and a plurality of doors, one for each compartment, each door being selectively movable between an open position in which the compartments can be accessed, and a closed position in which the doors block the openings into the compartments, wherein said bottom wall of the housing further comprising a track formed along the outer edge margin of the wall, said track receiving the plurality of doors therein for guiding the movement of the doors between their open and closed positions, and said top wall of the housing further comprising a track formed therein along the outer edge margin of the wall, said track receiving the plurality of doors therein for guiding the movement of the doors between their open and closed positions.

2. A storage cabinet as set forth in claim 1, said doors being interconnected by flexible connecting means, the arrangement being such that by moving one door to its closed position, the remaining doors are moved to their closed position.

3. A storage cabinet as set forth in claim 2 further comprising means for locking one of the doors in its closed position thereby locking all of the doors in their closed position.

4. A storage cabinet as set forth in claim 3, said locking means comprising a first latch ring mounted on, one of said doors and a second latch ring mounted on one of said top and bottom walls of said housing, said first and second latch rings each having an opening formed therein, the arrangement being such that when the doors-are in their closed position, the openings of the first and second latch rings are aligned to receive a lock for locking the doors in their closed position.

5. A storage cabinet for storing articles therein comprising:

a stand having a base portion adapted to lie on a horizontal surface, and an upright pole extending upwardly along a longitudinal axis from the base portion; and a housing having a top wall disposed along a horizontal plane, a bottom wall in spaced and parallel relation to the top wall, said bottom wall having means for rotatably mounting said housing on the pole of the stand about said axis, means interconnecting the bottom and top walls together, said interconnecting means defining a plurality of storage compartments for receiving articles therein, said rotatable mounting means comprising a bearing which is rotatably mounted on said post, said bearing being received within an axial bore formed in the bottom wall of the housing, said top wall of the housing having an upwardly facing surface with a recess formed therein, said recess being defined by a circumferential wall formed in the top wall, said recess being adapted to receive the base portion of another storage cabinet for assembling two storage cabinets in stacked relation, said circumferential wall having at least one inwardly extending detent section which defines an overlying lip and is adapted to be received in a mating inwardly extending recess formed in the base portion of the stand disposed thereabove, said base portion capable of being rotated so that the detent section overlies the base portion for interlocking the two stacked cabinets together.

6. A storage cabinet as set forth in claim 5, said base potion having a hollow region formed therein on its bottom surface for receiving a handle mounted on the housing of a storage cabinet interlocked therewith.

7. A storage cabinet for storing articles therein comprising:

a stand having
a base portion adapted to lie on a horizontal surface, and
an upright pole extending upwardly along a longitudinal axis from the base portion;

a housing having
a top wall disposed along a horizontal plane, said top wall having an upwardly facing surface with a recess formed therein, said recess being defined by a circumferential wall formed in the top wall, said recess being adapted to receive the base portion of another storage cabinet for assembling two storage cabinets in stacked relation,
a bottom wall in spaced and parallel relation to the top wall, said bottom wall having means for rotatably mounting said housing on the pole of the stand about said axis,
means interconnecting the bottom and top walls together, said interconnecting means defining a plurality of storage compartments for receiving articles therein; and interlocking means for interlocking the base portion of another storage cabinet to the top wall when assembling two storage cabinets in stacked relation.

8. A storage cabinet as set forth in claim 7, said interlocking means comprising at least one inwardly extending detent section formed in the circumferential wall, the detent section defining an overlying lip that is adapted to be received in a mating inwardly extending recess formed in the base portion of the stand disposed thereabove, said base portion capable of being rotated so that the detent section overlies the base portion for interlocking the two stacked cabinets together.

9. A storage cabinet as set forth in claim 8, said base portion having a hollow region formed therein on its bottom surface for receiving a handle mounted on the housing of a storage cabinet interlocked therewith.

* * * * *